Patented Aug. 15, 1944

2,355,632

UNITED STATES PATENT OFFICE 2,355,632

COATED INSULATING TAPE

Joseph M. Coffey, Schenectady, Joseph J. Pickney, Ballston Lake, and Robert L. Griffeth, Delanson, N. Y., assignors to Mica Insulator Company, Schenectady, N. Y., a corporation of New Jersey No Drawing. Application March 15, 1941, Serial No. 383,542

5 Claims. (Cl. 117—80)

The present invention relates to varnished bias tapes of the type used for wrapping cable joints, coil windings and the like and comprises a new insulating tape of this character which, as compared with bias insulating tapes now on the market, has an improved dielectric strength after elongation, after application of tension and after deformation.

Insulating tapes made of seamless bias cloth with from two to five varnish coatings thereon are in wide use in the electrical industry. Specifications as to the required performances of the tape vary in some respects but, in general, all call for an elasticity that gives an elongation of more than a certain per cent, when a definite load, per inch width, is applied for a definite time; the dielectric strength in volts per mil being reduced under such tension not more than a given amount. For example, the American Society for Testing Materials specifies that insulating tape having an initial dielectric strength of 1100 volts per mil shall have a dielectric strength of not less than 1000 volts per mil after a load of 6 lbs. per inch width has been applied for 35 minutes; the tape stretching under such load at least 2½%.

We have found that a highly improved tape, and one that more than meets all specifications, results when the varnish of at least the first coating is mixed with a compatible material that does not set the sizing of the fabric strip, but does adhere firmly to the surface of the fabric. We have found that chlorinated rubber is a suitable material for mixing with the varnish. Other materials, such as cellulose acetate, polyvinyl butyral and polyvinyl acetate, all of which make nonsetting coatings, are not satisfactory because they are not miscible with the oil of the varnish. The non-setting material cannot be used alone as the resultant product would not be sufficiently flexible. We have found that our superior product results when a coating for so-called "black" tape or for so-called "yellow" tape is prepared from a mixture containing 15 to 35% of chlorinated rubber and 85 to 65% of the solids in standard varnish. The standard varnishes above referred to comprise mixtures of linseed or other vegetable drying oil with a small proportion of driers, such as manganese and cobalt derivatives, and about 20% asphaltum in the case of the "black" varnish; a suitable thinner such as mineral spirits being added to the varnish. Asphaltum is omitted in the preparation of the "yellow" varnish. When preparing the new tape, the thinner for the coating mixture instead of mineral spirits, is a hi-flash solvent, for example hi-flash naphtha, or other coal tar solvent such as benzol, xylol or toluol. When "black" tape is to be made the chlorinated rubber in powdered form is dissolved in the thinner and then the ingredients of the "black" varnish, namely vegetable drying oil, driers and asphaltum, in the proportion of 15 to 35% by weight of the dry chlorinated rubber to 85 to 65% of the varnish solids are added thereto. The resulting coating mixture is then applied to the bias cloth, as by passage of the cloth through a bath of the mixture, the thinner is then evaporated and a second coating, this time, with or without chlorinated rubber mixed with the varnish is applied. As many coats, usually three or four, are applied as desired, with evaporation of the thinner between coating applications. The improved "yellow" tape using chlorinated rubber is prepared in the same way as above described for the "black" tape. In the above described coating mixtures suitable plasticizers, such as tricresyl phosphate, fish oil, castor oil and the like, could be substituted for the vegetable drying oil of the varnish.

Tests of improved "black" tape having four coatings thereon, of which chlorinated rubber comprised 25% of the solids of the first coating mixture, have shown that the product, as compared to standard tape, that is to tape coated with the same varnish but with no chlorinated rubber in the coatings thereof, is superior to such standard tape in the following respects.

It has improved dielectric properties after elongation test under loads. For example, the dielectric strength of the new tape, after being elongated 13% was not reduced below 1000 volts per mil, whereas the dielectric strength of standard tape dropped below this figure after 7% elongation.

It will support heavier loads before critical reduction of dielectric strength as compared with standard tape of equal elongation. For example the dielectric strength of the new tape was not reduced below 1000 volts per mil with a load of 9 pounds per inch width, whereas the dielectric strength of standard tape of equal elongation, rapidly decreased below this value with loads above 6 pounds per inch width.

It can be stretched or deformed to a greater extent before electrical breakdown occurs. For example, after stretching and the load removed, if the resulting deformation was greater than 4%, the dielectric strength of the standard tape dropped abruptly below 1000 volts per mil, whereas with a deformation of the new tape of as much as 7%, the dielectric strength was still 1000 volts per mil and decreased only gradually with greater deformation.

The tape retains its flexibility over longer periods of time and it has improved resistance to transformer oil and petrolatum.

The same is true of the improved "yellow" tape. Although we have found that the highly improved insulating tape above described does not require the addition of the non-setting material to more than the first coating, it can however be combined advantageously with the varnish of additional coatings if desired.

We believe that the reason why the new insulating tape is so markedly superior to tapes heretofore in use is because the coating does not harden the fabric, and does not set the sizing, and that, therefore, under tension the coating and fabric stretch more or less independently. We do not want however to be limited to any specific theory as to why the improved results are obtained. We do know however that a material for incorporation with the coating must be selected that is both miscible with the varnish and non-setting of the sizing of the fabric, and that when such material is incorporated with the varnish an insulating tape superior in every respect to tapes now on the market is produced.

We claim:

1. An insulating tape comprising a strip of sized bias fabric having a plurality of coatings thereon, of which at least the first coating comprises a mixture of oil varnish and chlorinated rubber.

2. An insulating tape according to claim 1 wherein the chlorinated rubber comprises 15 to 35% of said coating mixture.

3. Black insulating tape comprising a strip of sized bias fabric, a first coating thereon of vegetable drying oil, driers, asphaltum and chlorinated rubber, and a second coating thereon of vegetable drying oil, driers and asphaltum, the chlorinated rubber comprising 15 to 35% of said first coating.

4. Black insulating tape according to claim 3 wherein the chlorinated rubber comprises substantially 25% of said first coating.

5. An insulating tape comprising a strip of sized bias fabric having a plurality of coatings thereon of which at least the first coating includes chlorinated rubber and a plasticizer.

JOSEPH M. COFFEY.
JOSEPH J. PICKNEY.
ROBERT L. GRIFFETH.